US011241615B2

(12) United States Patent
Tao (10) Patent No.: US 11,241,615 B2
(45) Date of Patent: Feb. 8, 2022

(54) METHOD AND APPARATUS FOR CONTROLLING SHOOTING IN FOOTBALL GAME, COMPUTER DEVICE AND STORAGE MEDIUM

(71) Applicant: NETEASE (HANGZHOU) NETWORK CO.,LTD., Hangzhou (CN)

(72) Inventor: Yiyang Tao, Hangzhou (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 0 days.

(21) Appl. No.: 16/639,316

(22) PCT Filed: May 8, 2019

(86) PCT No.: PCT/CN2019/086026
§ 371 (c)(1),
(2) Date: Feb. 14, 2020

(87) PCT Pub. No.: WO2020/113901
PCT Pub. Date: Jun. 11, 2020

(65) Prior Publication Data
US 2021/0129014 A1 May 6, 2021

(30) Foreign Application Priority Data
Dec. 6, 2018 (CN) .......................... 201811489286.9

(51) Int. Cl.
*A63F 13/20* (2014.01)
*A63F 13/80* (2014.01)
(Continued)

(52) U.S. Cl.
CPC ........ *A63F 13/2145* (2014.09); *A63F 13/816* (2014.09); *G06F 3/0488* (2013.01); *G06F 3/04847* (2013.01)

(58) Field of Classification Search
CPC ............... A63F 13/2145; A63F 13/816; G06F 3/04847; G06F 3/0488
See application file for complete search history.

(56) References Cited

U.S. PATENT DOCUMENTS 9,492,724 B2 * 11/2016 Thurman ............ G09B 19/0038
10,478,734 B2 * 11/2019 Ueno .................... A63F 13/426
(Continued)

FOREIGN PATENT DOCUMENTS

| CN | 104460668 A | 3/2015 |
| CN | 105739855 A | 7/2016 |

(Continued)

OTHER PUBLICATIONS https://www.youtube.com/watch?v=FzwvyBUa4VY Crazy Freekick Football Game (Year: 2016).*
(Continued)

*Primary Examiner* — Mahelet Shiberou
(74) *Attorney, Agent, or Firm* — Qinghong Xu (57) ABSTRACT

The present disclosure relates to a method for controlling shooting in a football game, including: responding to a first touch operation acting on a shooting control, and determining an auxiliary input reference graphic within a preset range of the shooting control; and responding to a second touch operation acting on a screen region corresponding to the auxiliary input reference graphic, determining a target shooting position in a goal in the football game according to touch point position information of the second touch operation and a mapping relationship between the auxiliary input reference graphic and the goal, and controlling a virtual
(Continued)

character in the football game to execute a shooting action. In addition, the present disclosure further provides an apparatus for controlling shooting in a football game, a computer device and a storage medium.

15 Claims, 8 Drawing Sheets

(51) Int. Cl.
*G06F 3/048* (2013.01)
*A63F 13/2145* (2014.01)
*A63F 13/816* (2014.01)
*G06F 3/0484* (2013.01)
*G06F 3/0488* (2013.01)

(56) References Cited

U.S. PATENT DOCUMENTS

| | | | | |
|---|---|---|---|---|
| 10,596,436 B1* | 3/2020 | Campbell | ............ | A63B 69/407 |
| 2006/0128468 A1* | 6/2006 | Yoshikawa | ............ | A63F 13/573 |
| | | | | 463/36 |
| 2012/0257035 A1* | 10/2012 | Larsen | .................... | G06F 3/017 |
| | | | | 348/78 |
| 2014/0300745 A1* | 10/2014 | Kirk | .......................... | G06T 7/60 |
| | | | | 348/158 |
| 2015/0379351 A1* | 12/2015 | Dibenedetto | ...... | H04N 5/44504 |
| | | | | 345/633 |
| 2016/0375302 A1* | 12/2016 | Troutner | ............ | G06K 9/00342 |
| | | | | 473/199 |
| 2019/0126148 A1* | 5/2019 | Wei | ..................... | A63F 13/5255 |

FOREIGN PATENT DOCUMENTS

| | | |
|---|---|---|
| CN | 106325735 A | 1/2017 |
| CN | 106390444 A | 2/2017 |
| CN | 107422971 A | 12/2017 |
| EP | 1808211 A2 | 7/2007 |
| JP | 2006187638 A | 7/2006 |
| JP | 2007125238 A | 5/2007 |
| JP | 2016093361 A | 5/2016 |
| JP | 2016219057 A | 12/2016 |
| JP | 2017029799 A | 2/2017 |
| JP | 2017038916 A | 2/2017 |

OTHER PUBLICATIONS

The CN1OA issued Sep. 23, 2019 by the CNIPA.
The ISR issued Jul. 24, 2019 by the WIPO.

* cited by examiner

METHOD AND APPARATUS FOR CONTROLLING SHOOTING IN FOOTBALL GAME, COMPUTER DEVICE AND STORAGE MEDIUM

CROSS-REFERENCE TO RELATED APPLICATION

This application is the 371 application of PCT Application No. PCT/CN2019/086026, filed May 8, 2019, which is based upon and claims priority to the Chinese Patent Application 201811489286.9 filed Dec. 6, 2018, entitled "Method and Apparatus for Controlling Shooting in Football Game, Computer Device and Storage Medium", the entire contents of which are incorporated herein by reference.

TECHNICAL FIELD

The present disclosure relates to the field of human-computer interaction technologies, and more particularly, to a method and an apparatus for controlling shooting in a football game, a computer device and a storage medium.

BACKGROUND

With the popularization of smart phones in daily life and the increasing entertainment functions provided by the smart phones, mobile games are becoming more and more popular. Especially after the popularization of large display screens and 4G network technologies, more and more users play games through the smart phones, such as football games and basketball games.

Generally speaking, during the process of playing games with a mobile phone, the user inputs relevant control operations like positioning, motion track, shooting action and the like in the football game through touch operations such as slide trace, long press operation and the like. In this process, different input requirements are controlled by a pressing duration, slide trace or direction, slide speed, etc., inputted by the user. For example, in the football game, a shooting operation is inputted through a slide operation, where a shooting angle and a shooting strength are respectively related to a direction and a speed of the slide operation. Under such operation, the user can roughly control the shooting angle and the shooting strength, but it is realized by the inventor that from the view of the user, an intuitive relevance is low, and it is difficult to master accurate shooting, especially for junior players, which seriously affects the game experience of the user.

That is to say, in the current game schemes such as football, there may be a problem of insufficient control accuracy in the input schemes for game operations such as shooting.

It should be noted that the information disclosed in the above background section is only for enhancement of understanding the background of the present disclosure and therefore may include other information that does not form the prior art that is already known to those of ordinary skills in the art.

SUMMARY

Based on the above, in order to solve the technical problem of insufficient control accuracy in the input of shooting operations in the football games, the present disclosure provides an auxiliary input method, an auxiliary input apparatus, a terminal and a computer readable medium.

According to a first aspect, the embodiments of the present disclosure provide a method for controlling shooting in a football game, including: responding to a first touch operation acting on a shooting control, and determining an auxiliary input reference graphic within a preset range of the shooting control; and responding to a second touch operation acting on a screen region corresponding to the auxiliary input reference graphic, and determining a target shooting position in a goal in the football game according to touch point position information of the second touch operation and a mapping relationship between the auxiliary input reference graphic and the goal, and controlling a virtual character in the football game to execute a shooting action.

According to a second aspect, the embodiments of the present disclosure provide an apparatus for controlling shooting in a football game, including: a first touch operation detecting module configured to respond to a first touch operation acting on a shooting control, and determine an auxiliary input reference graphic within a preset range of the shooting control; a second touch operation detecting module configured to respond to a second touch operation acting on a screen region corresponding to the auxiliary input reference graphic; a target shooting position calculation module configured to determine a target shooting position in a goal in the football game according to touch point position information of the second touch operation and a mapping relationship between the auxiliary input reference graphic and the goal; and a shooting module configured to control a virtual character in the football game to execute a shooting action.

According to a third aspect, the embodiments of the present disclosure provide a computer device, including a processor and a memory storing a computer program, wherein the computer program, when being executed by the processor, enables the processor to execute the following steps of responding to a first touch operation acting on a shooting control, and determining an auxiliary input reference graphic within a preset range of the shooting control; and responding to a second touch operation acting on a screen region corresponding to the auxiliary input reference graphic, determining a target shooting position in a goal in the football game according to touch point position information of the second touch operation and a mapping relationship between the auxiliary input reference graphic and the goal, and controlling a virtual character in the football game to execute a shooting action.

According to a fourth aspect, the embodiments of the present disclosure provide a computer readable storage medium storing a computer program, wherein the computer program, when being executed by a processor, enables the processor to execute the following steps of: responding to a first touch operation acting on a shooting control, and determining an auxiliary input reference graphic within a preset range of the shooting control; and responding to a second touch operation acting on a screen region corresponding to the auxiliary input reference graphic, determining a target shooting position in a goal in the football game according to touch point position information of the second touch operation and a mapping relationship between the auxiliary input reference graphic and the goal, and controlling a virtual character in the football game to execute a shooting action.

It should be understood that the foregoing general description and the following detailed description are exemplary and explanatory only, and cannot limit the present disclosure.

BRIEF DESCRIPTION OF THE DRAWINGS

In order to illustrate the technical solutions in the embodiments of the present disclosure or in the related art more clearly, the drawings used in the description of the embodiments or the related art will be briefly described below. Obviously, the drawings in the following description are merely some embodiments recorded in the present disclosure. For those of ordinary skills in the art, other drawings may also be obtained based on the structures shown by these drawings without going through any creative work.

DETAILED DESCRIPTION

To make the objectives, technical solutions, and advantages of the present application clearer, the following further describes the present disclosure in detail with reference to the accompanying drawings and embodiments. It should be understood that the specific embodiments described herein are merely illustrative of the present disclosure and are not intended to limit the present disclosure.

In order to solve the technical problem of insufficient control accuracy in the input schemes of shooting operations in the football games, the present embodiment particularly provides a method for controlling shooting in a football game. The implementation of the method may depend on a computer program which can be run on a computer system based on a von Neumann system, and the computer program may be a game control application program based on a terminal device such as a smart phone, for example, a shooting control application program based on a football game in a smart phone.

It should be noted that in the present embodiment, the terminal on which the method for controlling shooting in a football game is based may be a mobile smart device such as a smart phone or a tablet computer. The terminal has a touch display screen through which a user may input touch operations such as a slide operation, a pressing operation and the like to input corresponding operation commands such as shooting.

Figure 1:
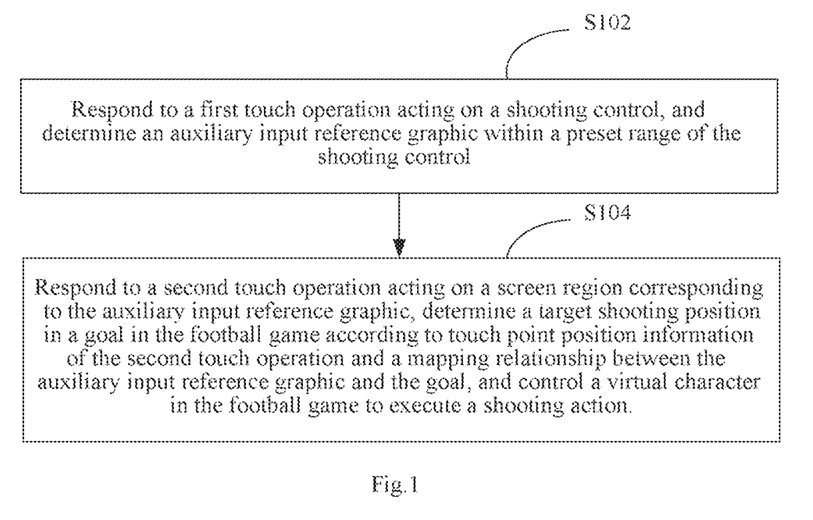
FIG. 1 is a flow chart of a method for controlling shooting in a football game in one embodiment.

To be specific, as shown in FIG. 1, a method for controlling shooting in a football game is provided, which specifically includes the following steps S102 to S104.

In step S102, in response to a first touch operation acting on a shooting control, an auxiliary input reference graphic is determined within a preset range of the shooting control.

Figure 2:
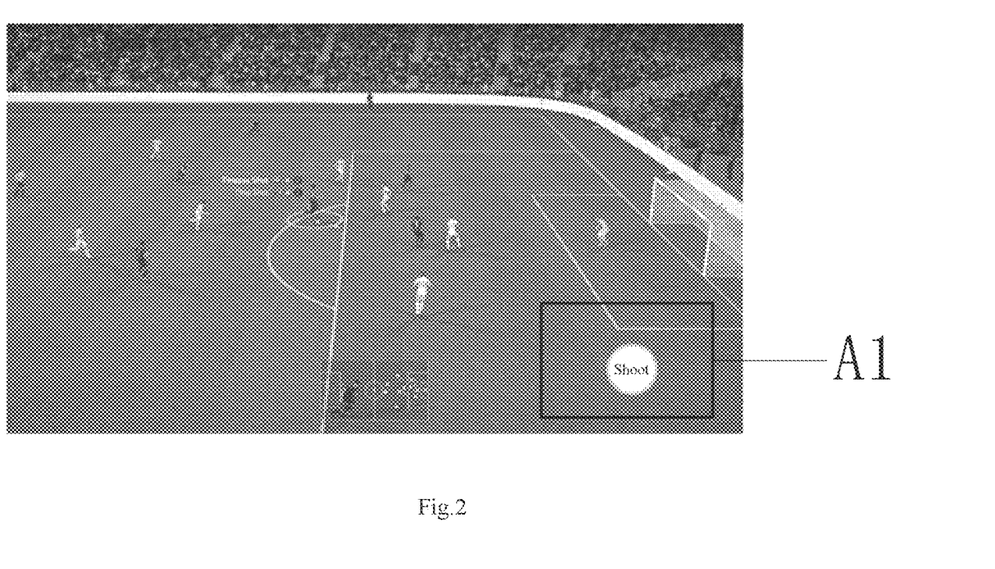
FIG. 2 is a schematic diagram of a football game interface in one embodiment.

In a corresponding game interface, a corresponding game user interface is set (for example, in a full screen mode, the game user interface refers to all the contents displayed on a mobile phone screen). For example, as shown in FIG. 2, a scene shown in FIG. 2 is a game user interface of a football game. Moreover, in the present embodiment, the game user interface is set with a shooting button through which a series of operations corresponding to a shooting operation may be triggered.

In the application scene shown in FIG. 2, a region indicated by No. A1 is the region where the shooting control is located, and the user may perform a shooting operation by inputting a touch operation (e.g., touch, click, press, and other operations) to the shooting control. When detecting that the user inputs a touch operation (first touch operation) with respect to the shooting control, it is determined that the user needs to perform the shooting operation, and an auxiliary input reference graphic is displayed in a region corresponding to the shooting control, for example, an auxiliary input reference graphic is displayed in the region indicated by No. A1, such as an auxiliary input reference graphic indicated by T1 in FIG. 3.

Figure 3:
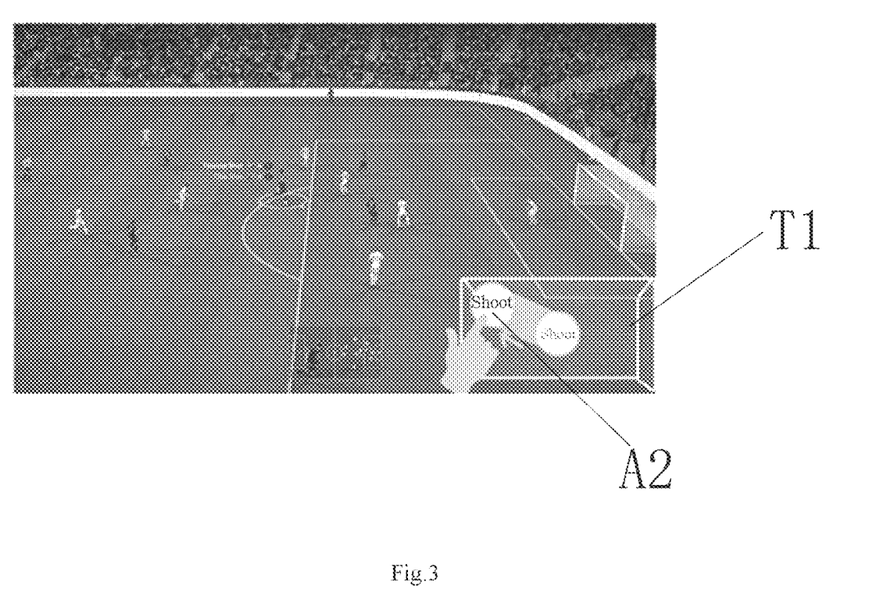
FIG. 3 is a schematic diagram of a football game interface in one embodiment.

Preferably, the auxiliary input reference graphic is a goal-shaped graphic, as shown in FIG. 3; in other embodiments, the auxiliary input reference graphic may also be a square reference graphic or the like, which may be specifically set according to practical application scenes and user preferences.

In the present embodiment, the auxiliary input reference graphic is triggered, determined and displayed by the touch operation with respect to the shooting control, and hidden after the shooting operation is completed. In another embodiment, the auxiliary input reference graphic may also be displayed all the time during the game, i.e., in the application scene shown in FIG. 3, the goal-shaped auxiliary input reference graphic is displayed all the time. It should be noted that in the present embodiment, in order to avoid misoperation of the user, when the first touch operation is not detected, the goal-shaped auxiliary input reference graphic is only displayed as an image and does not have actual touch functions. Only when the first touch operation is detected, the goal-shaped auxiliary input reference graphic has the corresponding shooting function and completes the detection and execution of the shooting operation.

In a specific embodiment, the auxiliary input reference graphic is displayed according to an instruction inputted by the user. The auxiliary input reference graphic is displayed when an operation related to the display of the auxiliary input reference graphic inputted by the user is detected, and the auxiliary input reference graphic is hidden in the case of detecting that the operation is completely inputted by the user or the user inputs a related operation of hiding the auxiliary input reference graphic.

In step S104, in response to a second touch operation acting on a screen region corresponding to the auxiliary input reference graphic, a target shooting position is determined in a goal in the football game according to touch point position information of the second touch operation and a mapping relationship between the auxiliary input reference graphic and the goal, and a virtual character in the football game is controlled to execute a shooting action.

In step S102, the user determines the auxiliary input reference graphic through the first touch operation; the user may input a shooting operation (second touch operation)

according to the reference of the auxiliary input reference graphic displayed to trigger the execution of the shooting action. The second touch operation may be a sliding operation, or a clicking operation, or a touch pressing operation, or other touch operations. In addition, the second touch operation further includes a touch point, which may be an end point of the sliding operation, or a click point of the clicking operation, or a pressing point of the touch pressing operation. In the present embodiment, a shooting position corresponding to the shooting action is determined according to a position of the touch point.

Specifically, the target shooting position in the goal in the football game is determined according to the touch point position information of the second touch operation and the mapping relationship between the auxiliary input reference graphic and the goal; and then the shooting action is executed according to the target shooting position.

It should be noted that in the present embodiment, the target shooting position corresponding to the shooting action is determined according to the touch point of the second touch operation. When the second touch operation is a sliding operation, when detecting that the sliding operation inputted by the user is completely inputted, the end position information of the sliding operation is acquired as the position information of the touch point, and then the target shooting position is calculated.

As mentioned above, the user may input a corresponding shooting command, a shooting instruction or a shooting operation by inputting the sliding operation. Moreover, in order to improve the intuitive experience of the user in the process of inputting the corresponding sliding operation and to reflect a relative relationship between the touch point corresponding to the sliding operation currently inputted by the user and the auxiliary input reference graphic, in the present embodiment, the current touch point is also displayed along with the input of the sliding operation by the user, and the current touch point may be displayed in a form of a preset control.

Specifically, the responding to the second touch operation acting on the auxiliary input reference graphic further includes: when detecting that the sliding operation is inputted, acquiring position information of a current touch point of the sliding operation in real time, and displaying the position information of the current touch point in a form of a preset control along with the input of the sliding operation.

The form of a preset control may be a suspending control, such as a control in the shape of a circle, a square, a sphere, etc., for displaying the corresponding touch points. For example, in the application scene shown in FIG. 3, a control indicated by No. A2 is a display form corresponding to the touch point.

In another optional embodiment, the above second touch operation may also be a touch dragging operation with respect to the shooting button (which is a dragging button that may be dragged), so that the detecting the input of the second touch operation by the user with respect to the auxiliary input reference graphic is a process of detecting the input of the touch dragging operation by the user with respect to the shooting button in the auxiliary input reference graphic, and a corresponding dragging button is moved along with the input of the touch dragging operation by the user to provide the user with an intuitive input experience. Reference may be made to a schematic diagram of a "shoot" button in FIG. 4.

In the present embodiment, the auxiliary input reference graphic in a touch input region is a reference goal which corresponds to the goal in the football game, and there is a mapping relationship between the two in size, and the mapping relationship is determined according to a size of the auxiliary input reference graphic and a size of the goal in the football game. For example, the auxiliary input reference graphic in the touch input region is a reference goal, a corresponding reference goal width is $w_1$ and a reference goal height is $h_1$; while in a current football game scene, an actual goal width is $w_2$ and a goal height is $h_2$. It may be determined that in the mapping relationship between the auxiliary input reference graphic and the goal in the football game, the mapping relationship of the goal width is $w_1/w_2$ and the mapping relationship of the goal height is $h_1/h_2$.

A reference shooting position of the shooting operation corresponding to the second touch operation in the auxiliary input reference graphic may be determined according to the position information of the touch point of the second touch operation, and then the target shooting position corresponding to the goal in the football game may be determined according to a corresponding relationship between the auxiliary input reference graphic and the football game.

Further, the calculation process of the above target shooting position may also be calculated by calculating a horizontal angle and a vertical angle of the shooting action (i.e., a target horizontal angle and a target vertical angle).

Figure 4:
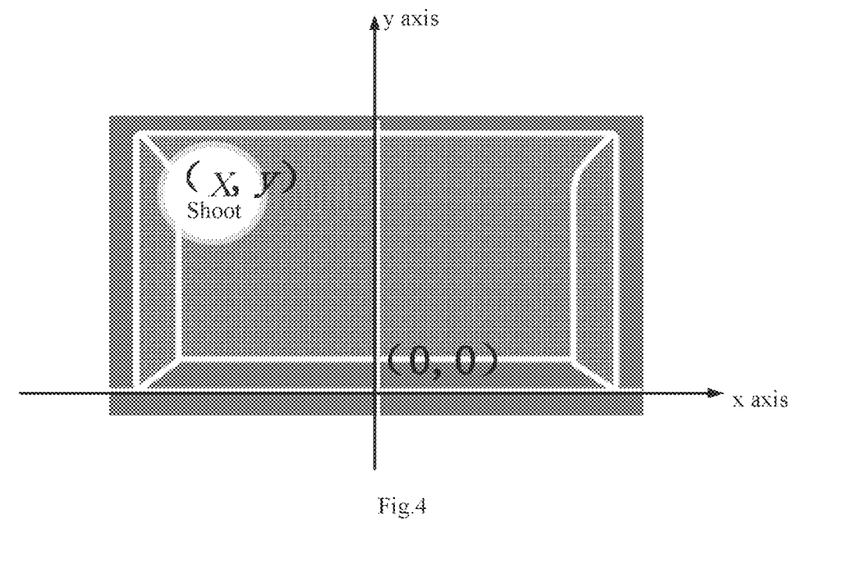
FIG. 4 is a schematic diagram of an auxiliary input reference graphic and a coordinate reference system in one embodiment.

Taking a point at the bottom of a center line of the reference goal as an origin of a reference coordinate system of the reference goal for example, as shown in FIG. 4, coordinates in the position information of the touch point are (x, y), so a horizontal relative distance of the second touch operation is x, and a vertical relative distance of the second touch operation is y.

Figure 5:
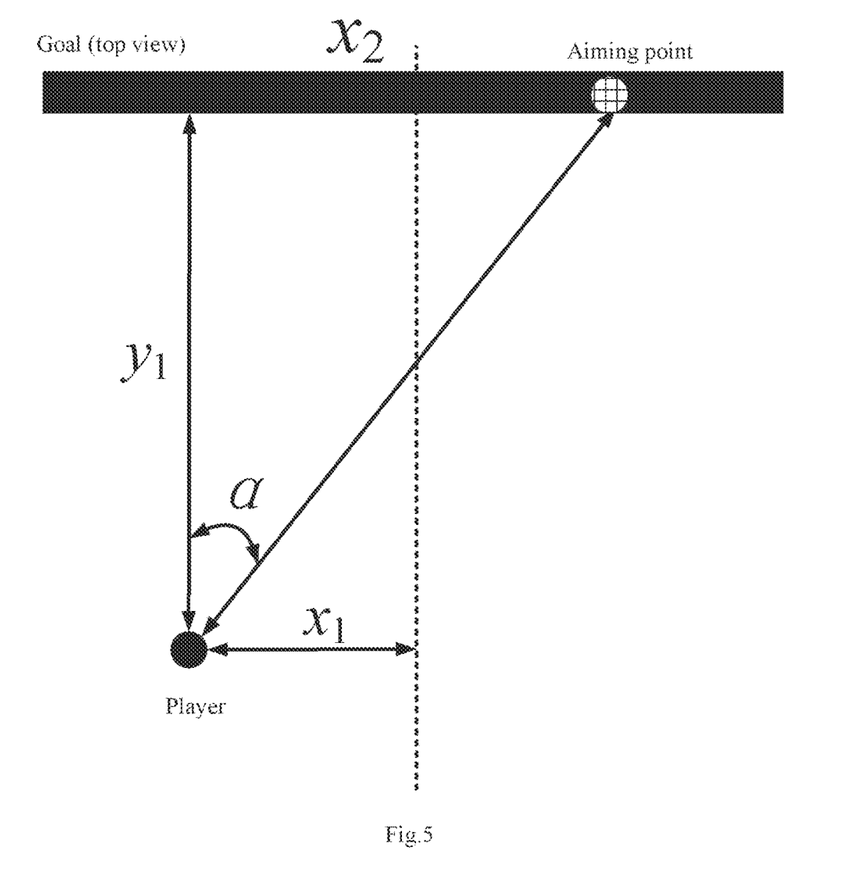
FIG. 5 is a schematic diagram of an angle calculation relation in one embodiment.

As shown in FIG. 5, a distance between the position (position of a player) of the current virtual character and the center line of the goal is $x_1$, and a distance between the position of the current virtual character and a straight line where the goal is located is $y_1$. Referring to FIG. 5, a corresponding horizontal angle when shooting, i.e., the target horizontal angle α, may be calculated. Specifically, a first horizontal coordinate corresponding to the touch point in an actually demanded game scene is:

$$x_2=x(w_2/w_1),$$

according to the first horizontal coordinate corresponding to the touch point and the position $(x_1, y_1)$ of the virtual character, the target horizontal angle α when shooting is calculated:

$$\tan\alpha=(x_1+x_2)/y_1,$$

then, a corresponding angle value is determined according to a trigonometric function value of the target horizontal angle α, thus determining a specific value of the target horizontal angle α.

Figure 6:
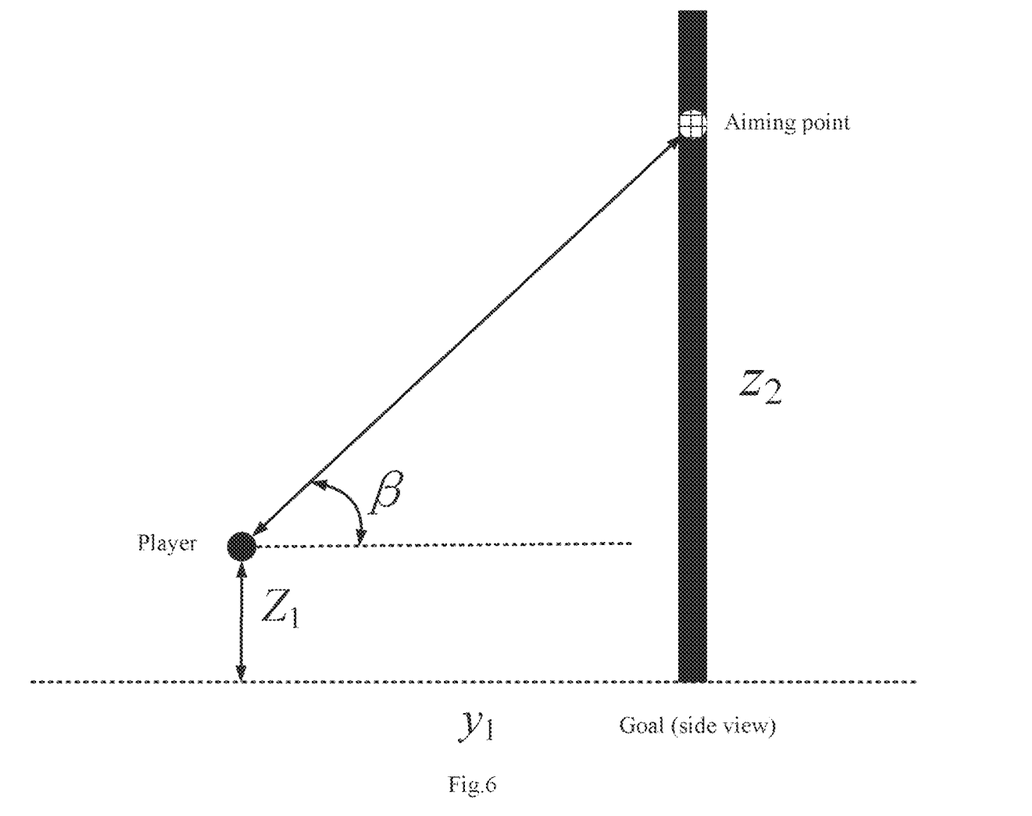
FIG. 6 is a schematic diagram of an angle calculation relation in one embodiment.

As shown in FIG. 6, a first vertical coordinate corresponding to the touch point in the actually demanded game scene is:

$$z_2=y(h_2/h_1)$$

In addition, in view of that a height of the ball from the ground when shooting is $z_1$, and it may be assumed that $z_1=0$;

then, according to the first vertical coordinate corresponding to the touch point and the position $(x_1, y_1)$ of the virtual character, the target vertical angle β when shooting is calculated:

$$\tan\beta=(z_2-z_1)/y_1,$$

then, a corresponding angle value is determined according to a trigonometric function value of the target vertical angle β, thus determining a specific value of the target vertical angle β.

It should be noted that in the present embodiment, gravity influence is not considered in the process of calculating the target horizontal angle and the target vertical angle corresponding to the shooting action, and it should be deemed that modifications made to the solution by adding a gravity factor is also included in the scope of the present disclosure.

After the target shooting position (or the target horizontal angle and the target vertical angle corresponding to the target shooting position) is determined, the current virtual character in the football game may be controlled to execute the corresponding shooting action according to the shooting program set in the football game to finish shooting.

Generally speaking, in the football game scene, different virtual objects (different players) correspond to different skill parameters, for example, a shooting skill parameter of a player object under a goalkeeper attribute is different from a shooting skill parameter of a player object under a winger attribute, and meanwhile, shooting success rates and angle deviation degrees are also different. Therefore, in order to improve the entertainment of the game, the skill parameter corresponding to the current virtual character needs to be considered when executing an interactive action corresponding to the sliding operation.

Specifically, the above step of controlling the virtual character in the football game to execute the shooting action further includes:

acquiring a skill parameter corresponding to the virtual character in the football game; and controlling the virtual character in the football game to execute a shooting action corresponding to the skill parameter and the target shooting position.

Specifically, specific parameters of the corresponding interactive action are determined according to a preset algorithm and according to the skill parameter and the target shooting position, and the interactive action is executed.

Figure 7:
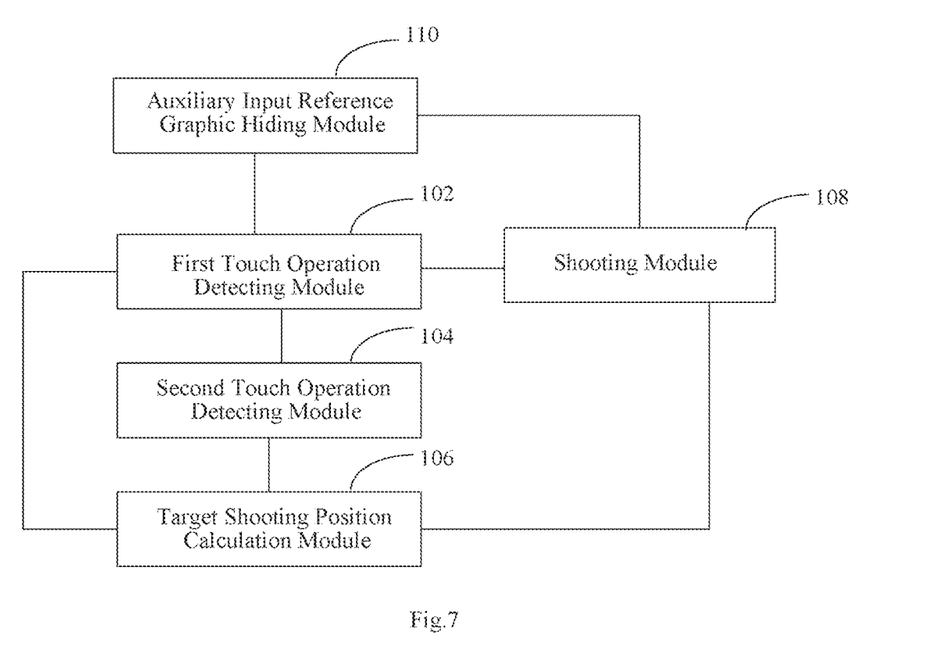
FIG. 7 is a structural block diagram of an apparatus for controlling shooting in a football game in one embodiment.

According to another aspect of the present disclosure, as shown in FIG. 7, the embodiments of the present disclosure provide an apparatus for controlling shooting in a football game, including:

a first touch operation detecting module 102 configured to respond to a first touch operation acting on a shooting control, and determine an auxiliary input reference graphic within a preset range of the shooting control;

a second touch operation detecting module 104 configured to respond to a second touch operation acting on a screen region corresponding to the auxiliary input reference graphic;

a target shooting position calculation module 106 configured to determine a target shooting position in a goal in the football game according to touch point position information of the second touch operation and a mapping relationship between the auxiliary input reference graphic and the goal; and a shooting module 108 configured to control a virtual character in the football game to execute a shooting action.

In an optional embodiment, the first touch operation is a clicking operation, and the second touch operation is a sliding operation continuous with the clicking operation; and the target shooting position calculation module 106 is further configured to, when detecting that the sliding operation is completely inputted, determine the target shooting position in the goal according to end position information of the sliding operation and the mapping relationship between the auxiliary input reference graphic and the goal in the football game.

In an optional embodiment, the first touch operation is a first clicking operation, and the second touch operation is a second clicking operation.

In an optional embodiment, the second touch operation detecting module 104 is further configured to, when detecting that the sliding operation is inputted, acquire position information of a current touch point of the sliding operation in real time, and display the position information of the current touch point in a form of a preset control along with the input of the sliding operation.

In an optional embodiment, the target shooting position calculation module 106 is further configured to calculate a target horizontal angle and a target vertical angle by a preset angle calculation formula according to the touch point position information of the second touch operation and the mapping relationship between the auxiliary input reference graphic and the goal in the football game, and determine the target shooting position according to the target horizontal angle and the target vertical angle.

In an optional embodiment, the shooting module 108 is further configured to acquire a skill parameter corresponding to the virtual character in the football game; and control the virtual character in the football game to execute a shooting action corresponding to the skill parameter and the target shooting position.

In an optional embodiment, as shown in FIG. 7, the apparatus further includes an auxiliary input reference graphic hiding module 110 configured to hide the auxiliary input reference graphic.

Figure 8:
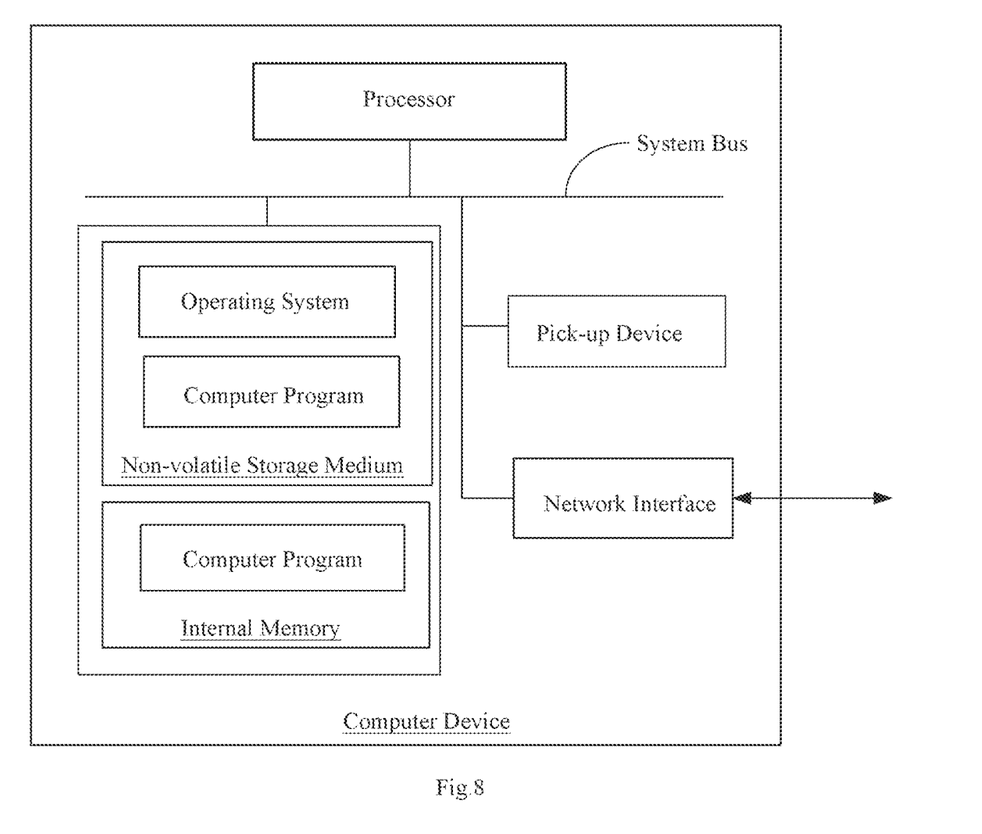
FIG. 8 is an internal structure diagram of a computer device in one embodiment.

FIG. 8 illustrates an internal structure diagram of a computer device in one embodiment. The computer device may be a terminal. As shown in FIG. 8, the computer device includes a processor, a memory, a pick-up device, and a network interface connected through a system bus. The memory includes a non-volatile storage medium and an internal memory. The non-volatile storage medium of the computer device stores an operating system, and may also store a computer program which, when being executed by the processor, enables the processor to implement the method for controlling shooting in a football game. The internal memory may also store a computer program which, when being executed by the processor, enables the processor to implement the method for controlling shooting in a football game. The pick-up device is configured to collect video images, and the network interface is configured to communicate with the outside world. Those skilled in the art can understand that the structure shown in FIG. 8 is only a block diagram of some structures related to the solutions of the present application and does not constitute a limitation on the computer device to which the solutions of the present application is applied. The specific computer device may include more or less components than those shown in the figures, or may combine some components, or have different component arrangements.

In one embodiment, the method for controlling shooting in a football game provided by the present application may be implemented in the form of a computer program which may be run on the computer device as shown in FIG. 8. Each program module constituting the apparatus for controlling shooting in a football game may be stored in the memory of the computer device.

A computer device includes a processor and a memory storing a computer program, wherein the computer program, when being executed by the processor, enables the processor to execute the following steps of:

responding to a first touch operation acting on a shooting control, and determining an auxiliary input reference graphic within a preset range of the shooting control; and responding to a second touch operation acting on a screen region corresponding to the auxiliary input reference graphic, determining a target shooting position in a goal in the football game according to touch point position information of the second touch operation and a mapping relationship between the auxiliary input reference graphic and the goal, and controlling a virtual character in the football game to execute a shooting action.

In one embodiment, the first touch operation is a clicking operation, and the second touch operation is a sliding operation continuous with the clicking operation. In one embodiment, the above-mentioned computer program, when being executed by the processor, is further configured to execute the following steps of: when detecting that the sliding operation is completely inputted, determining the target shooting position in the goal according to end position information of the sliding operation and the mapping relationship between the auxiliary input reference graphic and the goal in the football game, and controlling the virtual character in the football game to execute the shooting action.

In one embodiment, the first touch operation is a first clicking operation, and the second touch operation is a second clicking operation.

In one embodiment, the above-mentioned computer program, when being executed by the processor, is further configured to execute the following steps of: when detecting that the sliding operation is inputted, acquiring position information of a current touch point of the sliding operation in real time, and displaying the position information of the current touch point in a form of a preset control along with the input of the sliding operation.

In one embodiment, the above-mentioned computer program, when being executed by the processor, is further configured to execute the following steps of: calculating a target horizontal angle and a target vertical angle by a preset angle calculation formula according to the touch point position information of the second touch operation and the mapping relationship between the auxiliary input reference graphic and the goal in the football game, and determining the target shooting position according to the target horizontal angle and the target vertical angle.

In one embodiment, the above-mentioned computer program, when being executed by the processor, is further configured to execute the following steps of: acquiring a skill parameter corresponding to the virtual character in the football game; and controlling the virtual character in the football game to execute a shooting action corresponding to the skill parameter and the target shooting position.

In one embodiment, the above-mentioned computer program, when being executed by the processor, is further configured to execute the following step of: hiding the auxiliary input reference graphic.

A computer readable storage medium stores a computer program, wherein the computer program, when being executed by a processor, enables the processor to execute the following steps of:

responding to a first touch operation acting on a shooting control, and determining an auxiliary input reference graphic within a preset range of the shooting control; and responding to a second touch operation acting on a screen region corresponding to the auxiliary input reference graphic, determining a target shooting position in a goal in the football game according to touch point position information of the second touch operation and a mapping relationship between the auxiliary input reference graphic and the goal, and controlling a virtual character in the football game to execute a shooting action.

In one embodiment, the first touch operation is a clicking operation, and the second touch operation is a sliding operation continuous with the clicking operation. In one embodiment, the above-mentioned processor is further configured to execute the following steps of: when detecting that the sliding operation is completely inputted, determining the target shooting position in the goal according to end position information of the sliding operation and the mapping relationship between the auxiliary input reference graphic and the goal in the football game, and controlling the virtual character in the football game to execute the shooting action.

In one embodiment, the first touch operation is a first clicking operation, and the second touch operation is a second clicking operation.

In one embodiment, the above-mentioned processor is further configured to execute the following steps of: when detecting that the sliding operation is inputted, acquiring position information of a current touch point of the sliding operation in real time, and displaying the position information of the current touch point in a form of a preset control along with the input of the sliding operation.

In one embodiment, the above-mentioned processor is further configured to execute the following steps of: calculating a target horizontal angle and a target vertical angle by a preset angle calculation formula according to the touch point position information of the second touch operation and the mapping relationship between the auxiliary input reference graphic and the goal in the football game, and determining the target shooting position according to the target horizontal angle and the target vertical angle.

In one embodiment, the above-mentioned processor is further configured to execute the following steps of: acquiring a skill parameter corresponding to the virtual character in the football game; and controlling the virtual character in the football game to execute a shooting action corresponding to the skill parameter and the target shooting position.

In one embodiment, the above-mentioned processor is further configured to execute the following step of hiding the auxiliary input reference graphic.

By adopting the method for controlling shooting in a football game, the apparatus for controlling shooting in a football game, the compute device and the storage medium mentioned above, when a user performs football game operations on a terminal such as a smart phone, a shooting control is arranged on a corresponding game interface, and when a touch operation inputted by the user with respect to the shooting control is detected, the auxiliary input reference graphic is displayed for auxiliary display of the shooting operation inputted by the user, so as to display a visual input feeling of a corresponding shooting operation input to the user; then, when detecting that the user inputs a touch operation with respect to the auxiliary input reference graphic, a target shooting position of an enemy camp is calculated according to touch point position information corresponding to the touch operation and the mapping relationship between the displayed auxiliary input reference graphic and the goal, and then the virtual character in the football game is controlled to execute a shooting action corresponding to the target shooting position.

In other words, when the user shoots in a football game, the user may have an intuitive reference to a shooting result corresponding to the inputted touch operation by the reference and comparison of the auxiliary input reference graphic, thereby improving the accuracy of the shooting operation and improving the game experience of the user.

Those of ordinary skills in the art should understand that all or a part of the flow of the methods in the above embodiments may be implemented by instructing relevant hardware through a computer program. The program may be stored in a not-volatile computer-readable storage medium which, when being executed, may include the flow of the above-mentioned method embodiments. Any reference to the memory, storage, database or other media used in various embodiments provided by the present application may include non-volatile and/or volatile memory. The non-volatile memory may include a Read-only Memory (ROM), a Programmable ROM (PROM), an Electrically Programmable ROM (EPROM), an Electrically Erasable Programmable ROM (EEPROM), or a flash memory. The volatile memory may include a Random Access Memory (RAM) or an external high speed cache memory. By way of illustration rather than limitation, the RAM is available in various forms, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchronous Link (Synchlink) DRAM (SLDRAM), a Rambus Direct RAM (RDRAM), a Direct Rambus Dynamic RAM (DRDRAM), and a Rambus Dynamic RAM (RDRAM), etc.

The technical features of the above embodiments may be combined in any way. In order to simplify the description, not all the possible combinations of the technical features of the above embodiments are described. However, as long as there is no contradiction in the combinations of these technical features, they should be considered as the scope recorded in this specification.

The above described embodiments merely represent several embodiments of the present application, and the description thereof is more specific and detailed, but it should not be understood as a limitation to the patent scope of the present application. It should be noted that those of ordinary skills in the art may make a plurality of decorations and improvements without departing from the conceive of the present application, and these decorations and improvements shall all fall within the protection scope of the present application. Therefore, the patent protection scope of the present application should be subjected to the appended claims.

What is claimed is:

1. A method for controlling shooting in a football game, comprising:
　responding to a first touch operation acting on a shooting control, and determining an auxiliary input reference graphic within a preset range of the shooting control; and
　responding to a second touch operation acting on a screen region corresponding to the auxiliary input reference graphic, determining a target shooting position in a goal in the football game according to touch point position information of the second touch operation and a mapping relationship between the auxiliary input reference graphic and the goal, and controlling a virtual character in the football game to execute a shooting action,
　wherein the auxiliary input reference graphic is a reference goal,
　wherein the first touch operation is a clicking operation, and the second touch operation is a sliding operation continuous with the clicking operation; and
　wherein the responding to the second touch operation acting on the auxiliary input reference graphic, determining the target shooting position in the goal in the football game according to the touch point position information of the second touch operation and the mapping relationship between the auxiliary input reference graphic and the goal, and controlling the virtual character in the football game to execute the shooting action comprises:
　when detecting that the sliding operation is completely inputted, determining the target shooting position in the goal in the football game according to end position information of the sliding operation and the mapping relationship between the auxiliary input reference graphic and the goal, and controlling the virtual character in the football game to execute the shooting action.

2. The method according to claim 1, wherein the first touch operation is a first clicking operation, and the second touch operation is a second clicking operation.

3. The method for controlling shooting in a football game according to claim 1, wherein the responding to the second touch operation acting on the auxiliary input reference graphic further comprises:
　when detecting that the sliding operation is inputted, acquiring position information of a current touch point of the sliding operation in real time, and displaying the position information of the current touch point in a form of a preset control along with the input of the sliding operation.

4. The method for controlling shooting in a football game according to claim 1, wherein the responding to the second touch operation acting on the auxiliary input reference graphic, determining the target shooting position in the goal in the football game according to the touch point position information of the second touch operation and the mapping relationship between the auxiliary input reference graphic and the goal, and controlling the virtual character in the football game to execute the shooting action comprises:
　calculating a target horizontal angle and a target vertical angle by a preset angle calculation formula according to the touch point position information of the second touch operation and the mapping relationship between the auxiliary input reference graphic and the goal in the football game, and determining the target shooting position according to the target horizontal angle and the target vertical angle.

5. The method for controlling shooting in a football game according to claim 1, wherein the controlling the virtual character in the football game to execute the shooting action further comprises:
　acquiring a skill parameter corresponding to the virtual character in the football game; and
　controlling the virtual character in the football game to execute a shooting action corresponding to the skill parameter and the target shooting position.

6. The method for controlling shooting in a football game according to claim 1, wherein after controlling the virtual character in the football game to execute the shooting action, the method further comprises:
　hiding the auxiliary input reference graphic.

7. The method for controlling shooting in a football game according to claim 5, wherein after controlling the virtual character in the football game to execute the shooting action, the method further comprises:

hiding the auxiliary input reference graphic.

8. A computer device, comprising a processor and a memory storing a computer program, wherein the computer program, when being executed by the processor, enables the processor to:

respond to a first touch operation acting on a shooting control, and determine an auxiliary input reference graphic within a preset range of the shooting control;

respond to a second touch operation acting on a screen region corresponding to the auxiliary input reference graphic;

determine a target shooting position in a goal in the football game according to touch point position information of the second touch operation and a mapping relationship between the auxiliary input reference graphic and the goal; and control a virtual character in the football game to execute a shooting action, wherein the auxiliary input reference graphic is a reference goal, wherein the first touch operation is a clicking operation, and the second touch operation is a sliding operation continuous with the clicking operation; and wherein the processor is further configured to: when detecting that the sliding operation is completely inputted, determine the target shooting position in the goal in the football game according to end position information of the sliding operation and the mapping relationship between the auxiliary input reference graphic and the goal, and control the virtual character in the football game to execute the shooting action.

9. The computer device according to claim 8, wherein the first touch operation is a first clicking operation, and the second touch operation is a second clicking operation.

10. The computer device according to claim 8, wherein the processor is further configured to:

when detecting that the sliding operation is inputted, acquire position information of a current touch point of the sliding operation in real time, and display the position information of the current touch point in a form of a preset control along with the input of the sliding operation.

11. The computer device according to claim 8, wherein the processor is further configured to:

calculate a target horizontal angle and a target vertical angle by a preset angle calculation formula according to the touch point position information of the second touch operation and the mapping relationship between the auxiliary input reference graphic and the goal in the football game, and determine the target shooting position according to the target horizontal angle and the target vertical angle.

12. The computer device according to claim 8, wherein the processor is further configured to:

acquire a skill parameter corresponding to the virtual character in the football game; and control the virtual character in the football game to execute a shooting action corresponding to the skill parameter and the target shooting position.

13. The computer device according to claim 8, wherein the processor is further configured to:

hide the auxiliary input reference graphic.

14. The computer device according to claim 12, wherein the processor is further configured to:

hide the auxiliary input reference graphic.

15. A non-transitory computer readable storage medium storing a computer program, wherein the computer program, when being executed by a processor, enables the processor to:

respond to a first touch operation acting on a shooting control, and determine an auxiliary input reference graphic within a preset range of the shooting control;

respond to a second touch operation acting on a screen region corresponding to the auxiliary input reference graphic;

determine a target shooting position in a goal in the football game according to touch point position information of the second touch operation and a mapping relationship between the auxiliary input reference graphic and the goal; and control a virtual character in the football game to execute a shooting action, wherein the auxiliary input reference graphic is a reference goal, wherein the first touch operation is a clicking operation, and the second touch operation is a sliding operation continuous with the clicking operation; and wherein the processor is further configured to: when detecting that the sliding operation is completely inputted, determine the target shooting position in the goal in the football game according to end position information of the sliding operation and the mapping relationship between the auxiliary input reference graphic and the goal, and control the virtual character in the football game to execute the shooting action.

* * * * *